(12) United States Patent
Carr et al.

(10) Patent No.: US 6,848,243 B2
(45) Date of Patent: Feb. 1, 2005

(54) METHOD AND APPARATUS FOR CONTINUOUSLY HARVESTING GRAIN FROM A ROW OF MATURE GRAIN PLANTS COMPRISED OF PLANT SEGMENTS AND ALLEY SEGMENTS

(75) Inventors: Brian W. Carr, Nevada, IA (US); Donald F. Handorf, Ames, IA (US); Peter B. Moore, Ames, IA (US); Nick Merfeld, Nevada, IA (US); Scott A. Sporrer, Nevada, IA (US); Curtis R. Hammer, Nevada, IA (US); Gary W. Clem, Nevada, IA (US)

(73) Assignee: Gary W. Clem Inc., Nevada, IA (US)

( * ) Notice: Subject to any disclaimer, the term of this patent is extended or adjusted under 35 U.S.C. 154(b) by 0 days.

(21) Appl. No.: 10/663,512

(22) Filed: Sep. 16, 2003

(65) Prior Publication Data

US 2004/0187459 A1 Sep. 30, 2004

Related U.S. Application Data

(60) Provisional application No. 60/454,122, filed on Mar. 12, 2003.

(51) Int. Cl.[7] ............................................. A01D 75/28
(52) U.S. Cl. .................................................. 56/10.2 R
(58) Field of Search .................... 56/1, 10.2 R, 16.4 R, 56/16.6, 153, 219, DIG. 15; 460/23, 119

(56) References Cited

U.S. PATENT DOCUMENTS

| | | | | |
|---|---|---|---|---|
| 3,772,862 A | * | 11/1973 | Wilson ........................ 56/27.5 |
| 3,798,884 A | * | 3/1974 | Middleton ................... 56/27.5 |
| 3,930,354 A | * | 1/1976 | Borderie ......................... 56/94 |
| 4,177,628 A | * | 12/1979 | Brandt ......................... 56/209 |
| 4,209,918 A | * | 7/1980 | Klein ........................... 34/182 |
| 4,218,864 A | * | 8/1980 | Allemeersch et al. ........ 56/11.2 |
| 6,339,917 B1 | * | 1/2002 | Dillon et al. ................ 56/14.6 |
| 6,505,124 B2 | | 1/2003 | Carr et al. |

* cited by examiner

Primary Examiner—Heather Sheckelford
Assistant Examiner—Alicia Torres

(57) ABSTRACT

A wheel mounted grain harvester includes a harvesting head for depositing grain in a grain handling assembly comprised of a plurality of grain moving parts. Control means are located on the harvester for selectively interrupting grain flow along the grain moving parts causing harvested grain from a new separate row segment to temporarily accumulate. Means are provided for transporting the harvested grain from separate row segments into separate collection bins permit the separate evaluation of the harvested grain in each row segment. Means are provided for moving the harvester along the row at a constant rate of speed to avoid the necessity of stopping the harvester between row segments to effect the separate evaluation of the harvested grain. The selective interruption by the control means is accomplished by either interrupting at least one of the grain moving parts or by selectively closing a movable blocking wall mounted on the harvester.

19 Claims, 3 Drawing Sheets

METHOD AND APPARATUS FOR CONTINUOUSLY HARVESTING GRAIN FROM A ROW OF MATURE GRAIN PLANTS COMPRISED OF PLANT SEGMENTS AND ALLEY SEGMENTS

CROSS REFERENCE TO RELATED APPLICATIONS

This application claims the benefit of U.S. Provisional Application No. 60/454,122, filed Mar. 12, 2003.

BACKGROUND OF THE INVENTION

Test and Research Grain Plots are planted in parallel rows interrupted by transverse alleys. The row segments are normally comprised of different varieties of grain and must be separately harvested and not commingled. The crops are harvested by special combines which harvest one or several rows at a time. Such a combine is shown in U.S. Pat. No. 5,664,402. Typically, the combine harvests the row segment; and the operator stops the combine at the alleys to permit the grain from the harvested row segment to be processed (e.g., weighed, bagged, and identified, etc.) The stopping and starting of the combine at the alleys is inefficient, hard on the combine, and hard on the operator.

It is therefore a principal object of this invention to provide a method and apparatus for continuously harvesting grain from a row of mature grain plants comprised of plant segments and alley segments.

A further object of this invention is to enhance the harvesting operation by speeding it up through driving the combine at a continuous and constant speed through the field.

These and other objects will be apparent to those skilled in the art.

SUMMARY OF THE INVENTION

A wheel mounted grain harvester includes a harvesting head for depositing grain in a grain handling assembly comprised of a plurality of grain moving parts. Control means are located on the harvester for selectively interrupting grain flow along the grain moving parts causing harvested grain from a new separate row segment to temporarily accumulate. Means are provided for transporting the harvested grain from separate row segments into separate collection bins permit the separate evaluation of the harvested grain in each row segment. Means are provided for moving the harvester along the row at a constant rate of speed to avoid the necessity of stopping the harvester between row segments to effect the separate evaluation of the harvested grain. The selective interruption by the control means is accomplished by either interrupting at least one of the grain moving parts or by selectively closing a movable blocking wall mounted on the harvester.

BRIEF DESCRIPTION OF THE DRAWINGS

Figure 1:
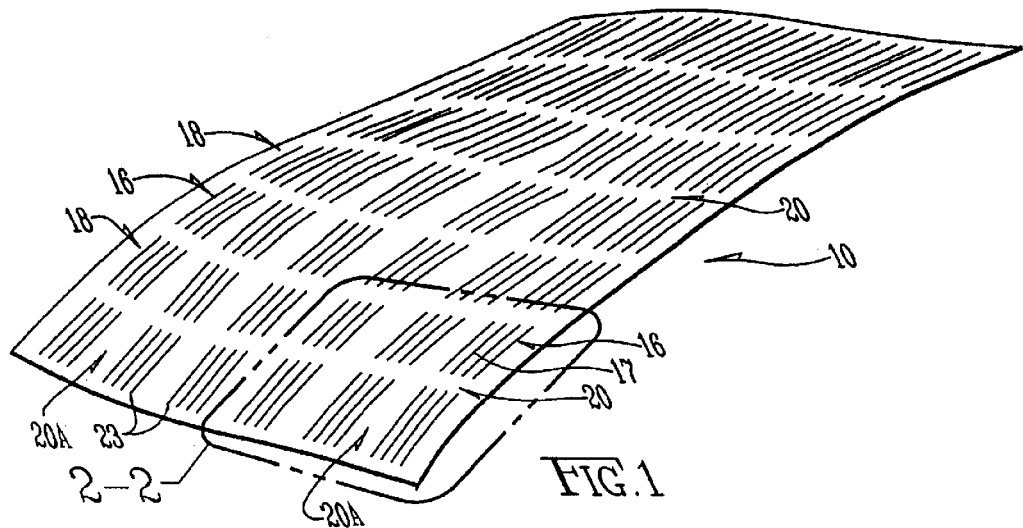
FIG. 1 is a perspective view of a typical research field showing a plurality of rows (ranges) separated by transverse alleys.
Figure 2:
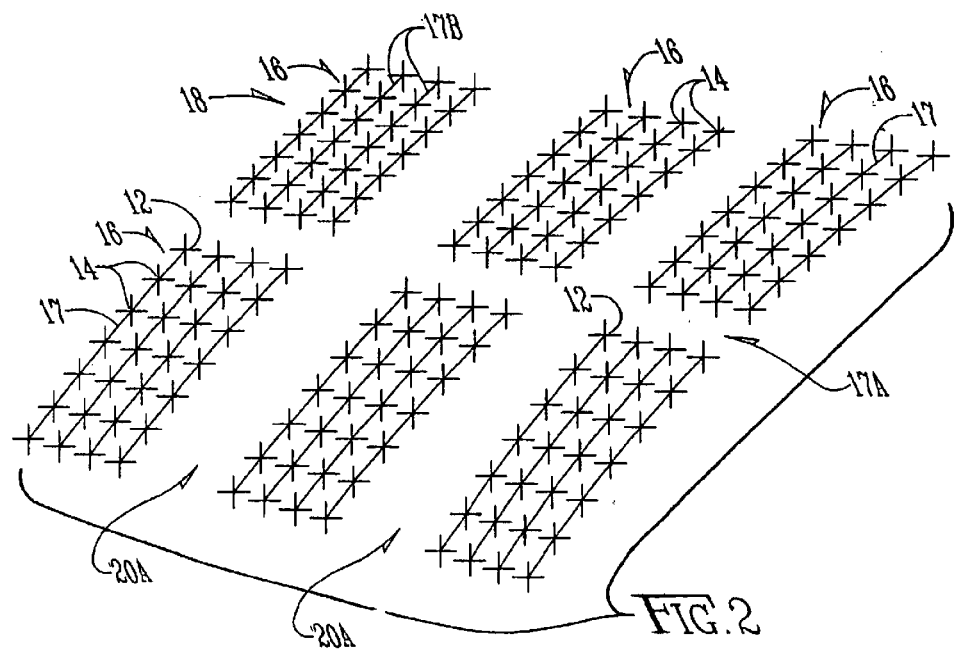
FIG. 2 is an enlarged scale perspective view of the area outlined in lines 2—2 of FIG. 1.
Figure 3:
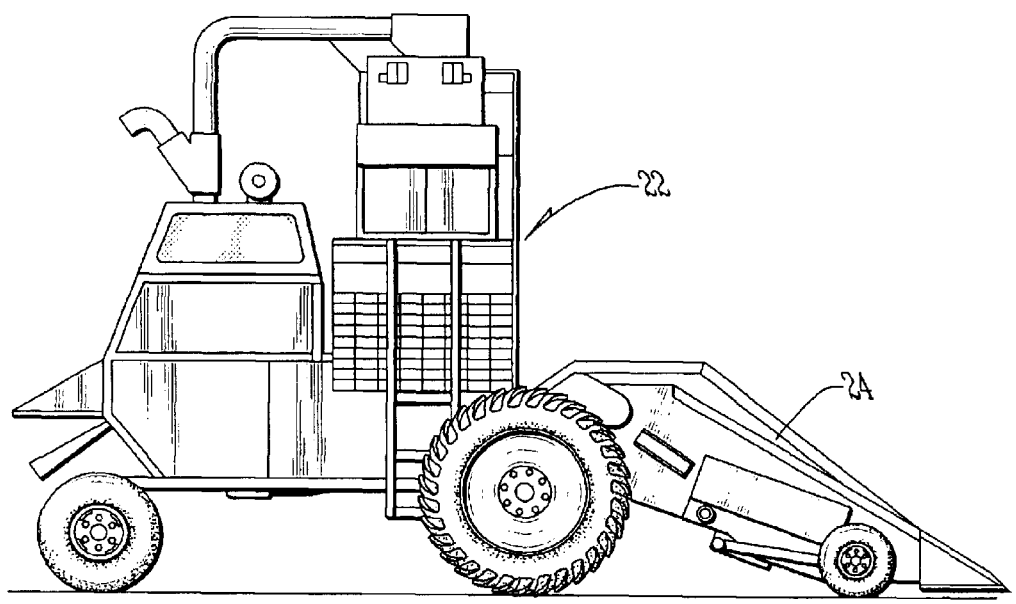
FIG. 3 is a side elevational view of a harvesting combine.
Figure 4:
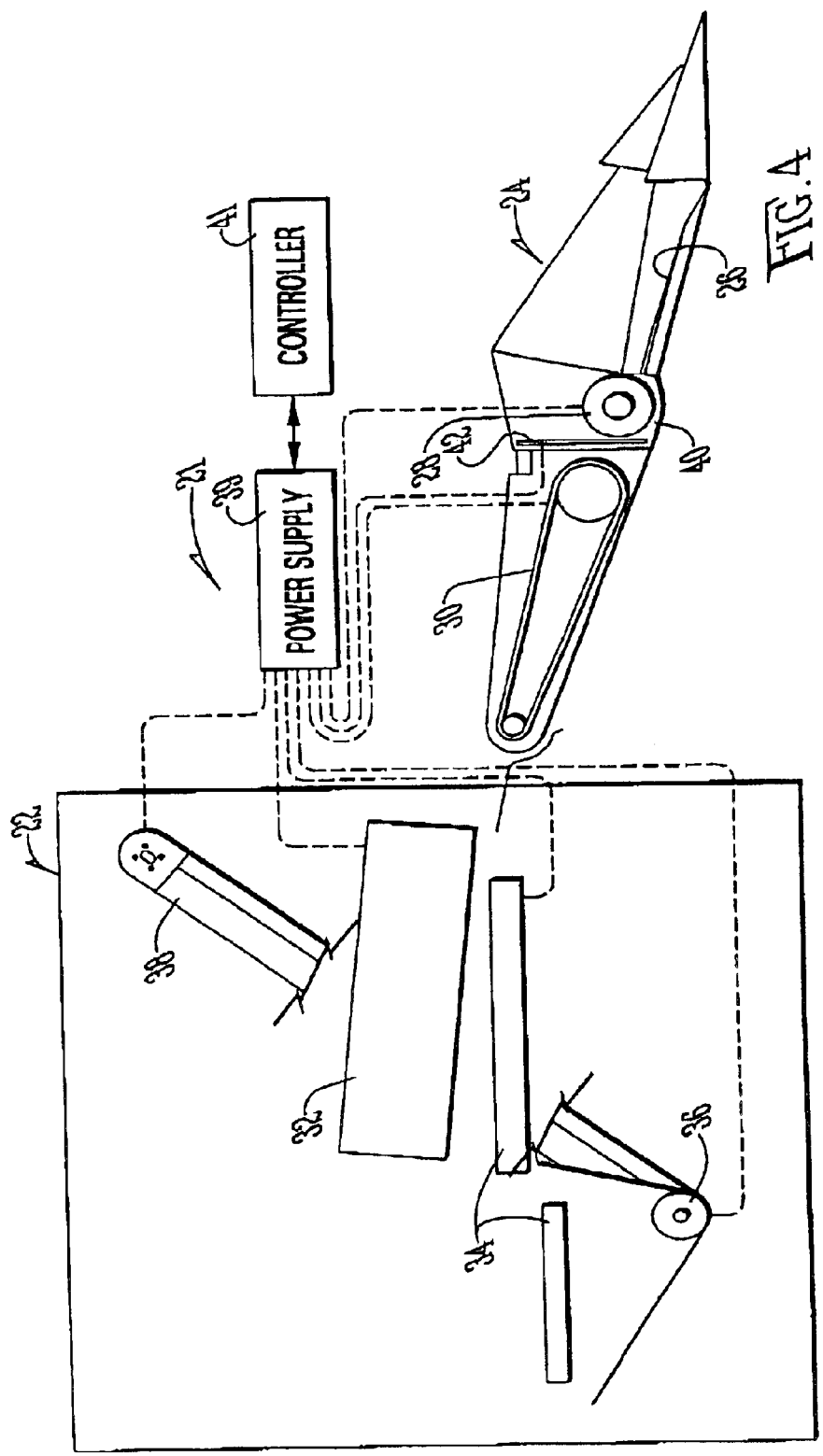
FIG. 4 is a side schematic elevation of a combine with a corn head.

The numeral 10 designates a research field in which row crop seeds are planted for research purposes. The planting locations of each seed planted is designated by the numeral 12, and the plants resulting from the subsequent germination of the seeds are designated by the numerals 14.

The field 10 is divided into a plurality of plots 16 which are comprised of a plurality of parallel rows 17B. The plots are located in a series of parallel ranges 18 which are separated by laterally extending alleys 20 (geometrically in an "x" direction) and a series of longitudinal alleys 20a (geometrically in a "y" direction). Alleys 20 and 22 are typically at right angles to each other. Each range has a plurality of parallel crop rows 17B that are comprised of crop segments 17 and alley segments 17A.

A grain harvester 21 includes a combine 22 and harvesting head 24 suitable for corn with gathering chains 26 that sever the crop and move it (e.g., ears of corn) upwardly and rearwardly. A grain transfer assembly includes drag chains 30 for transporting grains from the harvesting head 24 to the combine 22. A grain handling assembly includes grain moving parts such as cross auger 28, drag chains 30, rotors 32, cleaning system 34, clean grain auger 36, and elevator hopper 38. A suitable power means 39 operates all of these conventional components.

A controller 41 in the cab of the combine is capable of selectively and separately operating each of the grain moving parts by selectively actuating the power supply 39. Suitable controllers 41 include but are not limited to central processing units or the like.

A blocking wall 42 is also operated by the controller 41. The blocking wall 42 is adapted for selective vertical movement and can be located between the cross auger 28 and head 24 to selectively stop the travel of harvested crop to the drag chains 30. This would temporarily interrupt the flow of harvested crop into the combine 22. Similarly, the controller 41 can also selectively stop the cross auger 28, for example, to also interrupt the flow of harvested grain. When this flow is interrupted, the harvested crop accumulates at collection area 40 until the controller 41 either raises blocking wall 42 or restarts the cross auger 28, or other parts that may have its operation stopped.

Blocking wall 42 may be located at alternative positions to selectively stop the travel of harvested crop. Specifically, blocking wall 42 may be positioned between the grain transferring assembly (including drag chains 30) and combine 22 portion of the harvester 21.

In operation, the harvester 21 continuously harvests grain from at least one row of mature grain plants growing in first row segments and intermittently interrupted by an alley segment where no grain plants exist. The harvester 21 straddles the row with the wheel-mounted combine 22 having the harvesting head 24 to remove grain from the grain plants in the row and delivering the removed grain upwardly and rearwardly for deposit in the grain handling assembly comprised of the plurality of grain moving parts (28, 30, 32, 34, 36, & 38) for delivery of the removed grain to a conventional grain collection hopper (not shown). Power means 39 on the harvester 21 operates the harvesting head 24 and the grain moving parts and permitting the harvester 21 to selectively continuously move longitudinally over the row segments 17B and the alley segments 17A between the row segments 17B. The control means 41 on the combine selectively interrupts at least one of the grain moving parts as soon as the last plant in a first row segment is harvested so that no new harvested grain from a second and next adjacent row segment will be commingled with the harvested grain from the first row segment. This causes harvested grain from the second row segment to temporarily accumulate adjacent the grain moving part that is temporarily stopped. The control means 41 then actuates the power means 39 to start the stopped grain moving part after a period of time (or distance) while the harvesting head 24 is harvesting plants in the second row segment, and transporting the harvested grain from separate row segments into conventional separate collection bins (not shown) to permit the separate evaluation of the harvested grain in each row segment. Meanwhile the harvester 21 moves along the row at a continuous and constant rate of speed to avoid the necessity of stopping the harvester 21 at each alley 17A to effect the separate evaluation of the harvested grain from aligned separate row segments 17B in all row segments 17B adjacent each alley 17A.

Current methods of harvesting such plots by the stop and go method reveal the data in Table 1.

TABLE 1

| Current methods | | Length |
|---|---|---|
| MPH | Ft/sec | 17.5 |
| 0.48 | 0.700 | 25 |
| 0.60 | 0.875 | 20 |
| 0.66 | 0.972 | 18 |
| 0.80 | 1.167 | 15 |

By contrast, the method of this invention improves the harvesting efficiency, as shown in Table 2 below.

TABLE 2

| Non-Stop Harvesting | | | Alley Length | | | | |
|---|---|---|---|---|---|---|---|
| MPH | ft/sec | Pl. Length 17.5 | 24" 2 | 30" 2.5 | 36" 3 | 42" 3.5 | 48" 4 |
| 0.8 | 1.173 | 14.92 | 1.71 | 2.13 | 2.56 | 2.98 | 3.41 |
| 0.9 | 1.319 | 13.27 | 1.52 | 1.90 | 2.27 | 2.65 | 3.03 |
| 1 | 1.466 | 11.94 | 1.36 | 1.71 | 2.05 | 2.39 | 2.73 |
| 2 | 2.932 | 5.97 | 0.68 | 0.85 | 1.02 | 1.19 | 1.36 |

This results in an increased efficiency in harvesting time as shown in Table 3. In Table 3, the horizontal line starting with 14.92 indicates seconds per plot for the new system. The column numbers starting with 25 represents seconds per plot under existing systems. Table 3 is calculated for a row of plants 17.5 feet in length.

TABLE 3

| | Efficiency Factors | | | |
|---|---|---|---|---|
| VS. | 14.92 | 13.27 | 11.94 | 5.97 |
| 25 | 1.68 | 1.88 | 2.09 | 4.19 |
| 20 | 1.34 | 1.51 | 1.68 | 3.35 |
| 18 | 1.21 | 1.36 | 1.51 | 3.02 |
| 15 | 1.01 | 1.13 | 1.26 | 2.51 |

Tables 1–3 above show that the present invention has several advantages. The alleys between the plots create approximately a two second delay in material flow into the harvester 21. These alleys 20 can be sensed by the control means 41 of the present invention through a sensor means (not shown). Suitable sensor means include, but are not limited to the following: Global Positioning System (GPS), stalk sensor, encoder, and/or key entry by the operator. Specifically, the sensor means would indicate to the control means when the harvester 21 reaches the last plant in the particular plot 16. The control means 41 would then selectively interrupt the grain flow so that no new harvested grain from the second and next adjacent row segment will be commingled with the harvested grain from the first row segment. The control means 41 will continue this interruption for a pre-determined period, such as a period of time or distance. For instance, as previously discussed above, the control means 41 can selectively interrupt the flow of grain by stalling the cross auger 28. Such a stalling of the cross auger 28 could be accomplished by a clutch associated with the cross auger 28. For example, the control means 41 could activate the clutch associated with the cross auger 28 to stall the cross auger 28 for two seconds. Such a break in grain flow will amplify the alley 20 to produce a desirable break in the material flow, where the break in material flow is approximately four seconds total. Meanwhile, additional corn is still gathered and moved to the cross auger 28 by the gathering chains 26. Thus, approximately 30 inches of roll length or 4 to 6 ears of corn will be gathered at cross auger 28 during the break in material flow. This results in a front loading of material flow into the harvesting head 24 at each plot 16. This additional front loading of the plot 16 potentially improves threshing by improving the load of the cylinder.

Additionally, such a process improves data gathering, as there is little motion in the weight hopper (not shown) when the harvester 21 is moving at one foot per second. This type of movement would be no more than the normal machine vibration, and is an improvement over the prior art.

Further, the present invention eliminates the need for stopping and starting of the harvester 21 at the alleys 20, greatly reducing operator fatigue and greatly reducing wear and tear on equipment drives.

One of ordinary skill in the art, will appreciate that air hopper controls may be used to increase the speed of harvester 21, without departing from the present invention. Additionally, it is contemplated that Near-Infrared (NIR) or other similar technology can be implemented with the present invention where higher moisture levels are present.

It is therefore seen that this invention will achieve at least all of its stated objectives.

We claim:

1. A method of continuously harvesting grain from at least one row of mature grain plants growing in first row segments and intermittently interrupted by an alley segment where no grain plants exist, comprising:

straddling the row with a wheel-mounted harvester having a harvesting head to remove grain from the grain plants in the row and delivering the removed grain upwardly and rearwardly for deposit in a grain handling assembly comprised of a plurality of grain moving parts for delivery of the removed grain to a grain collection hopper with separate collection bins, supplying power means on the harvester for operating the harvesting head and the grain moving parts and for permitting the harvester to selectively continuously move longitudinally over the row segments and the alley segments between the row segments, control means on the combine for selectively interrupting at least one of the grain moving parts as soon as the last plant in a first row segment is harvested so that no new harvested grain from a second and next adjacent row segment will be commingled with the harvested grain from the first row segment, and causing harvested grain from the second row segment to temporarily accumulate adjacent the grain moving part that is temporarily stopped, and actuating the power means to restart the stopped grain moving part after a period while the harvesting head is harvesting plants in the second row segment, and transporting the harvested grain from separate row segments into the separate collection bins to permit the separate evaluation of the harvested grain in each row segment, moving the harvester along the row at a continuous and constant rate of speed to avoid the necessity of stopping the combine at each alley to effect the separate evaluation of the harvested grain from aligned separate row segments in all row segments adjacent each alley.

2. The method of claim 1 wherein the grain moving part selectively interrupted by the control means is a set of drag chains for gathering harvested grain downstream of the harvesting head operatively connected to the control means and the power means to selectively be stopped from operating.

3. The method of claim 1 wherein the grain moving part selectively interrupted by the control means is a cross auger for gathering harvested grain downstream of the harvesting head operatively connected to the control means and the power means to selectively be stopped from operating.

4. The method of claim 1 wherein the final ground speed of the harvester is substantially constant in a speed range of 0.0700 ft/sec to 1.687 feet/second.

5. The method of claim 1 wherein the length of the row segments varies between 3 and 25 feet, and the length of the alley segments varies between 12 and 48 inches.

6. The method of claim 1 wherein the period is quantified by time.

7. The method of claim 1 wherein the period is quantified by distance.

8. The method of claim 1 wherein the combine straddles a plurality of rows and performs the aforesaid method on each row.

9. A wheel mounted grain harvester having a grain harvesting head for harvesting grain from mature grain plants in a row of mature grain plots comprising a plurality of longitudinal spaced row segments spaced intermittently by aligned alley segments, removing grain from the grain plants in the rows and delivering the removed grain upwardly and rearwardly for deposit in a grain handling assembly comprised of a plurality of grain moving parts for delivery of the removed grain to a grain collection hopper, the invention comprising:

control means on the harvester for selectively interrupting at least one of the grain moving parts as soon as the last plant in a first row segment is harvested so that no new harvested grain from a second and next adjacent row segment will be commingled with the harvested grain from the first row segment, causing harvested grain from the second row segment to temporarily accumulate adjacent the grain moving part that is temporarily stopped, and selectively restarting the stopped grain moving part after a period while the harvesting head harvests a first plant in the second row segment, means for transporting the harvested grain from separate row segments into separate collection bins to permit the separate evaluation of the harvested grain in each row segment, and means for moving the harvester along the row at a continuous and constant rate of speed to avoid the necessity of stopping the harvester at each alley to effect the separate evaluation of the harvested grain from aligned separate row segments in all row segments adjacent each alley.

10. The apparatus of claim 9 including a power means on the harvester for operating the harvesting head and the grain moving parts and for permitting the harvester to selectively continuously move longitudinally over the row segments and the alley segments between the row segments, wherein the grain moving part selectively interrupted by the control means is a set of drag chains for gathering harvested grain downstream of the harvesting head operatively connected to the control means and the power means to selectively be stopped from operating.

11. The apparatus of claim 9 including a power means on the harvester for operating the harvesting head and the grain moving parts and for permitting the harvester to selectively continuously move longitudinally over the row segments and the alley segments between the row segments, wherein the grain moving part selectively interrupted by the control means is a cross auger for gathering harvested grain downstream of the harvesting head operatively connected to the control means and the power means to selectively be stopped from operating.

12. The apparatus of claim 9 wherein the period is quantified by time.

13. The apparatus of claim 9 wherein the period is quantified by distance.

14. A wheel mounted grain harvester having a combine attached to a grain harvesting head for harvesting grain from mature grain plants in a row of mature grain plots comprising a plurality of longitudinal spaced row segments spaced intermittently by aligned alley segments, removing grain from the grain plants in the rows and delivering the removed grain upwardly and rearwardly for deposit in a grain handling assembly comprised of a plurality of grain moving parts for delivery of the removed grain to a grain collection hopper, the invention comprising:

a movable blocking wall located along the grain handling assembly which blocks the flow of grain along the grain handling assembly when closed, control means on the harvester for selectively closing the blocking wall as soon as the last plant in a first row segment is harvested so that no new harvested grain from a second and next adjacent row segment will be commingled with the harvested grain from the first row segment, causing harvested grain from the second row segment to temporarily accumulate adjacent blocking wall, and selectively opening the blocking wall a period while the harvesting head harvests a first plant in the second row segment, means for transporting the harvested grain from separate row segments into separate collection bins to permit the separate evaluation of the harvested grain in each row segment, and means for moving the harvester along the row at a continuous and constant rate of speed to avoid the necessity of stopping the harvester at each alley to effect the separate evaluation of the harvested grain from aligned separate row segments in all row segments adjacent each alley.

15. The apparatus of claim 14 wherein the combine straddles a plurality of rows and performs the aforesaid method on each row.

16. The apparatus of claim 14, wherein the movable blocking wall is mounted on the harvester between a grain transfer assembly and a combine portion of the harvester to periodically interrupt the flow of harvested grain.

17. The apparatus of claim 14 wherein the movable blocking wall is mounted on the harvester between a cross auger and the grain transfer assembly to periodically interrupt the flow of harvested grain.

18. The apparatus of claim 14 wherein the period is quantified by time.

19. The apparatus of claim 14 wherein the period is quantified by distance.

* * * * *